United States Patent
Herz

(10) Patent No.: US 7,581,182 B1
(45) Date of Patent: Aug. 25, 2009

(54) APPARATUS, METHOD, AND 3D GRAPHICAL USER INTERFACE FOR MEDIA CENTERS

(75) Inventor: William Samuel Herz, Hayward, CA (US)

(73) Assignee: NVIDIA Corporation, Santa Clara, CA (US)

( * ) Notice: Subject to any disclaimer, the term of this patent is extended or adjusted under 35 U.S.C. 154(b) by 873 days.

(21) Appl. No.: 10/622,865

(22) Filed: Jul. 18, 2003

(51) Int. Cl.
*G06F 3/00* (2006.01)
*G06F 3/048* (2006.01)

(52) U.S. Cl. .................. 715/713; 715/710; 715/709; 715/711; 715/712

(58) Field of Classification Search .................. 715/855, 715/788, 805, 709, 710, 711, 712, 713, 852, 715/839
See application file for complete search history.

(56) References Cited

U.S. PATENT DOCUMENTS

| | | | | |
|---|---|---|---|---|
| 5,500,794 A * | 3/1996 | Fujita et al. .................. 700/83 |
| 5,539,822 A | 7/1996 | Lett |
| 5,673,089 A | 9/1997 | Yuen et al. |
| 5,687,331 A * | 11/1997 | Volk et al. .................. 715/840 |
| 5,724,492 A * | 3/1998 | Matthews et al. ............ 345/419 |
| 5,752,160 A * | 5/1998 | Dunn ........................... 725/93 |
| 5,870,150 A | 2/1999 | Yuen |
| 5,886,753 A * | 3/1999 | Shinyagaito et al. ........... 725/59 |
| 5,936,611 A * | 8/1999 | Yoshida ...................... 345/158 |
| 5,956,025 A * | 9/1999 | Goulden et al. ............. 715/716 |
| 5,987,213 A | 11/1999 | Mankovitz et al. |
| 6,005,579 A * | 12/1999 | Sugiyama et al. ........... 715/855 |
| 6,023,275 A * | 2/2000 | Horvitz et al. .............. 715/700 |
| 6,043,818 A * | 3/2000 | Nakano et al. .............. 715/851 |
| 6,094,237 A * | 7/2000 | Hashimoto .................. 348/731 |
| 6,100,941 A | 8/2000 | Dimitrova et al. |
| 6,184,884 B1 * | 2/2001 | Nagahara et al. ............ 715/828 |
| 6,192,187 B1 | 2/2001 | Kinghorn |
| 6,204,885 B1 | 3/2001 | Kwoh |
| 6,211,870 B1 * | 4/2001 | Foster ......................... 715/744 |
| 6,236,398 B1 * | 5/2001 | Kojima et al. ............... 345/419 |
| 6,271,842 B1 * | 8/2001 | Bardon et al. ............... 715/848 |
| 6,285,357 B1 * | 9/2001 | Kushiro et al. .............. 345/169 |
| 6,288,708 B1 * | 9/2001 | Stringer ...................... 345/169 |
| 6,295,062 B1 * | 9/2001 | Tada et al. ................... 715/835 |
| 6,317,706 B1 * | 11/2001 | Saib ............................ 703/27 |
| 6,341,196 B1 | 1/2002 | Ando et al. |
| 6,356,706 B1 | 3/2002 | Ando et al. |
| 6,371,765 B1 * | 4/2002 | Wall et al. ................... 434/224 |
| 6,396,523 B1 * | 5/2002 | Segal et al. ................. 715/863 |
| 6,397,288 B1 * | 5/2002 | Rye et al. ................... 710/305 |
| 6,400,379 B1 | 6/2002 | Johnson et al. |
| 6,417,869 B1 * | 7/2002 | Do ............................. 715/718 |
| 6,421,067 B1 * | 7/2002 | Kamen et al. ............... 715/719 |
| 6,456,331 B2 | 9/2002 | Kwoh |
| 6,469,633 B1 * | 10/2002 | Wachter ................. 340/825.69 |

(Continued)

FOREIGN PATENT DOCUMENTS

EP          1096453 A2 *   5/2001

*Primary Examiner*—Steven B Theriault
(74) *Attorney, Agent, or Firm*—Cooley Godward Kronish LLP

(57) ABSTRACT

Media center icons are used to navigate a media center. The media center icons may include media device icons, a remote control icon, and media player icons. The media center icons may be used during a setup process, to select between media devices, and to navigate between media devices and media content.

19 Claims, 19 Drawing Sheets

U.S. PATENT DOCUMENTS

| | | | |
|---|---|---|---|
| 6,473,751 B1 | 10/2002 | Nikolovska et al. | |
| 6,496,122 B2* | 12/2002 | Sampsell | 340/825.69 |
| 6,499,029 B1 | 12/2002 | Kurapati et al. | |
| 6,501,516 B1* | 12/2002 | Clapper | 348/734 |
| 6,559,066 B2* | 5/2003 | Terashita et al. | 438/759 |
| 6,559,866 B2* | 5/2003 | Kolde et al. | 715/765 |
| 6,597,358 B2* | 7/2003 | Miller | 345/427 |
| 6,747,591 B1* | 6/2004 | Lilleness et al. | 341/176 |
| 6,788,241 B2* | 9/2004 | Arling et al. | 341/176 |
| 6,819,344 B2* | 11/2004 | Robbins | 715/848 |
| 6,822,698 B2* | 11/2004 | Clapper | 348/734 |
| 6,829,779 B1* | 12/2004 | Perlman | 725/37 |
| 6,874,152 B2* | 3/2005 | Vermeire et al. | 719/330 |
| 6,909,378 B1* | 6/2005 | Lambrechts et al. | 340/825.22 |
| 6,976,215 B1* | 12/2005 | Roderick et al. | 715/702 |
| 7,013,434 B2* | 3/2006 | Masters et al. | 715/840 |
| 7,013,435 B2* | 3/2006 | Gallo et al. | 715/850 |
| 7,043,691 B1* | 5/2006 | Kwon et al. | 715/705 |
| 7,111,320 B1* | 9/2006 | Novak | 725/139 |
| 7,132,973 B2* | 11/2006 | Jindal | 341/176 |
| 7,134,095 B1* | 11/2006 | Smith et al. | 715/860 |
| 7,137,075 B2* | 11/2006 | Hoshino et al. | 715/848 |
| 7,143,017 B2* | 11/2006 | Flynn et al. | 703/6 |
| 7,191,401 B2* | 3/2007 | Roderick et al. | 715/702 |
| 2001/0015719 A1* | 8/2001 | VAN EE et al. | 345/158 |
| 2001/0026386 A1* | 10/2001 | Yamamoto et al. | 359/142 |
| 2001/0040571 A1* | 11/2001 | Miller | 345/419 |
| 2001/0044855 A1* | 11/2001 | Vermeire et al. | 709/310 |
| 2002/0118131 A1* | 8/2002 | Yates et al. | 341/176 |
| 2002/0140855 A1* | 10/2002 | Hayes et al. | 348/465 |
| 2002/0158772 A1* | 10/2002 | Mears | 340/825.22 |
| 2002/0162108 A1* | 10/2002 | Lin-Hendel | 725/52 |
| 2002/0174270 A1* | 11/2002 | Stecyk et al. | 710/1 |
| 2002/0175944 A1* | 11/2002 | Kolde et al. | 345/773 |
| 2002/0194596 A1* | 12/2002 | Srivastava | 725/37 |
| 2003/0041060 A1* | 2/2003 | Lester et al. | 707/7 |
| 2003/0056215 A1* | 3/2003 | Kanungo | 725/38 |
| 2003/0067484 A1* | 4/2003 | Moir | 345/747 |
| 2003/0095156 A1* | 5/2003 | Klein et al. | 345/864 |
| 2003/0169299 A1* | 9/2003 | Kusano et al. | 345/810 |
| 2004/0041723 A1* | 3/2004 | Shibamiya et al. | 341/176 |
| 2004/0046744 A1* | 3/2004 | Rafii et al. | 345/168 |
| 2005/0028206 A1* | 2/2005 | Cameron et al. | 725/46 |
| 2005/0057497 A1* | 3/2005 | Kawahara | 345/157 |
| 2005/0060661 A1* | 3/2005 | Kawahara et al. | 715/782 |
| 2005/0184968 A1* | 8/2005 | Uchida et al. | 345/173 |
| 2005/0204306 A1* | 9/2005 | Kawahara et al. | 715/782 |
| 2005/0262535 A1* | 11/2005 | Uchida et al. | 725/80 |
| 2006/0004834 A1* | 1/2006 | Pyhalammi et al. | 707/102 |
| 2006/0038794 A1* | 2/2006 | Shneidman | 345/173 |
| 2006/0050142 A1* | 3/2006 | Scott et al. | 348/14.05 |
| 2006/0227033 A1* | 10/2006 | Shibamiya et al. | 341/176 |
| 2006/0253874 A1* | 11/2006 | Stark et al. | 725/62 |
| 2006/0259864 A1* | 11/2006 | Klein et al. | 715/738 |
| 2007/0176787 A1* | 8/2007 | Iten et al. | 340/825.69 |

* cited by examiner

APPARATUS, METHOD, AND 3D GRAPHICAL USER INTERFACE FOR MEDIA CENTERS

FIELD OF THE INVENTION

The present invention is generally related to user interfaces for media centers, such as, for example, user interfaces for personal computer media centers. More particularly, the present invention is directed towards a graphical user interface for a user to control media devices in a media center or media server.

BACKGROUND OF THE INVENTION

Media centers are increasingly of interest in consumer electronics. Media centers utilize processing circuitry to acquire, organize, distribute, store, present, and control different types of audio-visual media devices, such as a television receiver, digital versatile disc (DVD) player, digital video recorder (DVR), or compact disk (CD) player.

A media center may be part of a set-top box or be part of a personal computer (i.e., a media center PC) connected to other audio-visual devices. For example, a personal computer (PC) operating the Microsoft Windows® operating system may use a media player to play digital media from different types of media devices. Media center PCs are multifunction devices that allow users to watch, organize, and present TV and DVDs, listen to music, view pictures, play games, and record, distribute, or present audio-video content.

FIG. 1 illustrates a conventional graphical user interface 100 for a media center. The graphical user interface includes a plurality of tabs arranged about a media window 102, such as a television tab 105, DVR tab 110, electronic program guide (EPG) tab 115, and games tab 120.

One benefit of a media center is that it provides a common interface for controlling different types of digital media generated from different media devices. For example, in a home entertainment system a media center allows a user to switch between different types of media with one device (e.g., switch between TV, DVDs, music CDs). Additionally a media center allows a user to switch between different content for a given media device (i.e., between different types of music for a CD player or between different movies for a DVD player).

However, media centers can be difficult for users to navigate between different types of media. This is particularly true for home systems in which a television is often used as the visual display. Television is commonly viewed from a distance of ten feet or more, which limits the amount of information that can be comfortably displayed using a conventional graphical user interface, such as that illustrated in FIG. 1.

Additionally, users can become frustrated if the media center does not respond fast enough. Consumers are conditioned to expect almost immediate response to commands input from a television remote control. However, a media center can take a significant fraction of second (or even several seconds) for the media center computer to complete certain commands input from a remote control, such as commands to switch between different types of media.

Therefore, what is desired is an improved system, method, and intuitive graphical user interface for controlling a media center to facilitate organizing and managing large amounts of content.

SUMMARY OF THE INVENTION

A graphical user interface for a media center includes media center icons for navigating media content. The media center icons may include a remote control icon, media device icon, media content icons, or a media player icon.

In one embodiment, at least one three-dimensional media center icon is displayed to represent at least one attribute of the media center. In response to a user input, at least one media center icon is updated to display information and/or actions associated with media played by the media center through three-dimensional animation. In one aspect, the media center icon is a remote control icon and the remote control icon is updated to indicate that a command is being processed from a remote control, thereby acknowledging processing by echoing back the command via updating the remote control icon. In some embodiments, annotations or sounds may be used to indicate that a command is being processed from a remote control. In another aspect, the three-dimensional media center icon is a media device icon and the image of the media device icon is updated to indicate that the corresponding media device is active, such as by placing a copy of the icon in a position near an active media player. In another aspect, the media center icon is a media player icon having a media window that is rotated to a side view when a new media player icon is opened. In some embodiments the media player icon is flipped out of main focus while having some remnant still visible so the user can retrieve or know what content and media player is already open.

One embodiment includes a media center having a display, computer, graphics processor for generating graphical images, and a remote control for inputting commands to the computer. The computer is configured to display media center icons to represent attributes of the media center.

One aspect of a media center icon is that it may be a remote control icon having buttons arranged in a similar manner as a universal remote control of the media center. This permits a user to receive visual confirmation from the remote control icon that commands have been entered and are being processed by the media center. In some embodiments, additional animation and/or sound cues may also be provided to alert a user that a command has been entered and is being processed. In one embodiment, entering a mode selection command via a button on the universal remote control results in a corresponding button of the remote control icon also being depressed. Another aspect of the media center icons is that a plurality of media device icons may be arranged in a three-dimensional stack to represent a physical stack of entertainment devices, such as a TV receiver, DVD player, DVR, CD player, Internet appliance, or other audio-video set-top box. In one embodiment, the media device icons are three-dimensional icons such that a user may navigate both a front side to select a media device and a rear connector side to emulate the view and manipulation of connections during a setup process. In another embodiment, a user may activate a media device by selecting the corresponding media device icon.

Still another aspect of the media center icons is that an individual media player icon may represent a three-dimensional display panel having a media window for displaying content. This permits a variety of three dimensional transition effects to be used to represent the transition from active media player icons to inactive media player icons, such as by rotating media player icons to indicate opening or closing of media players. Additionally, this permits media player icons that are not in use to be rotated orthogonally relative to active media player icons, providing a visual thread of navigation history. In one embodiment, a CD player tray of a CD player icon opens and closes to indicate loading/unloading of a physical CD.

One benefit of the present invention is that it provides an intuitive graphical user interface for controlling a media center. Additionally, the media device icons provide an intuitive graphical user interface for navigating between different types of media devices and their associated media.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
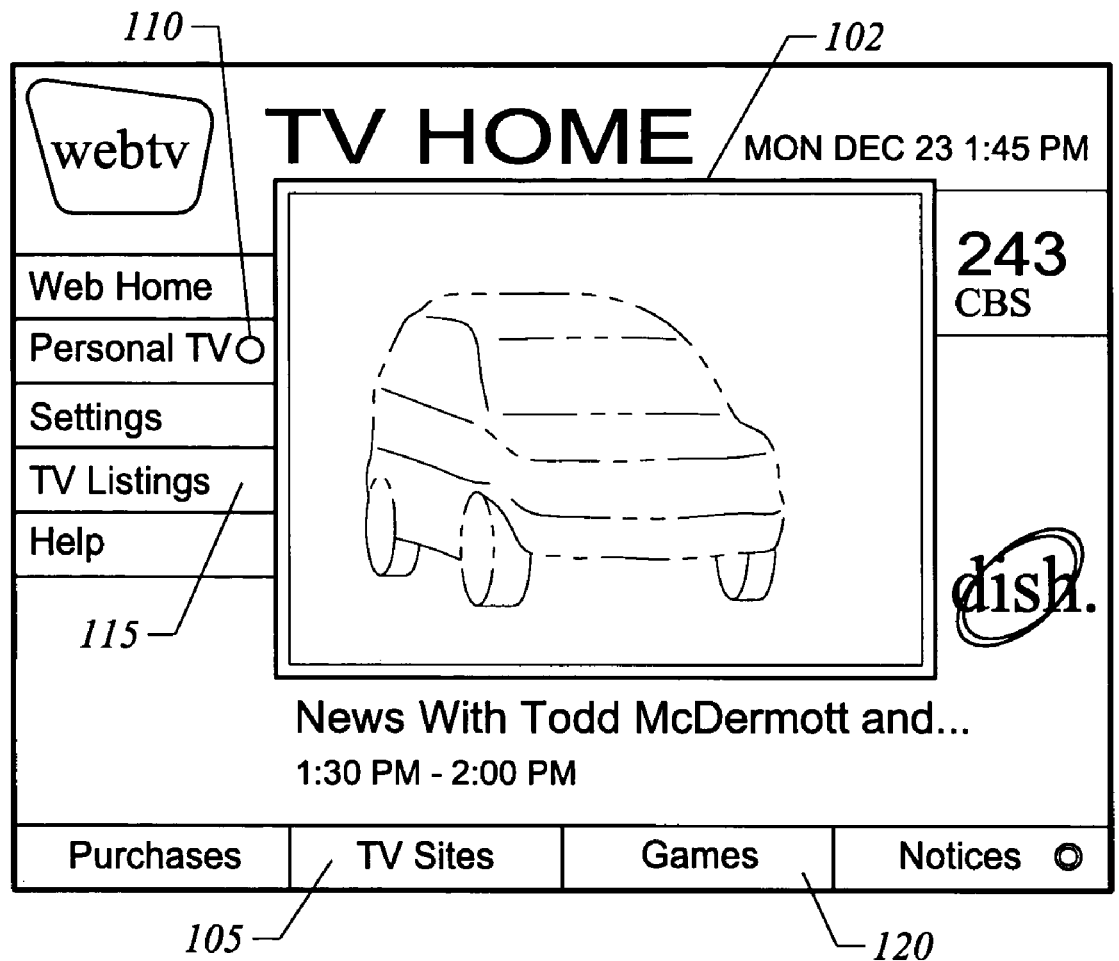
FIG. 1 illustrates a prior art graphical user interface for a media center.
Figure 2:
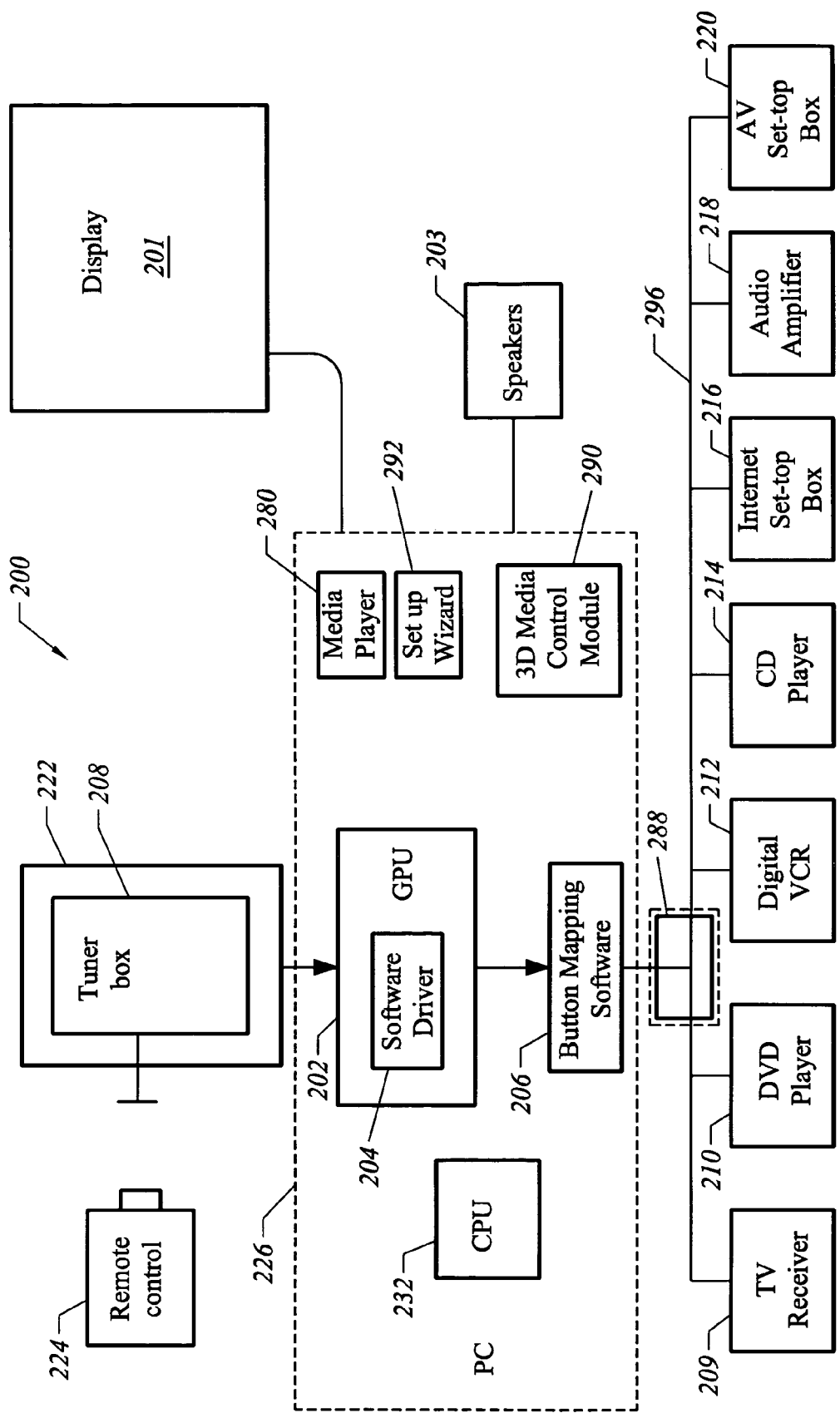
FIG. 2 is a functional block diagram illustrating an exemplary media center apparatus in accordance with the present invention.

The present invention relates to an apparatus, method, and graphical user interface for navigating a media center using media center icons to represent attributes of the media center, including a client or server associated with the media center. FIG. 2 shows an exemplary media center 200 having a display 201 and speakers 203 for presenting media content in accordance with one embodiment of the present invention. Display 201 may be a television screen or a computer monitor.

Media center 200 is adapted to present content from different types of media devices, such as a television receiver 209, a personal video recorder (PVR) 212 (sometimes also known as a digital VCR), a DVD player 210, a CD player 214, Internet set-top box 216, audio amplifier 218, or an audio-visual set top box 220.

Television receiver 209 receives a television signal and associated electronic program guide (EPG) data, such as from a satellite signal or a cable STB. PVR 212 includes a memory for storing audio-visual files, such as MPEG-2 compressed video files in digital format. It will be understood that an individual Internet set-top box 216 may be of a type that downloads digital media files from the Internet, such as digital radio or MP3 files. Audio amplifier 218 may comprise one or more audio amplifiers, such as amplifiers for one or more speakers 203. Other types of audio-visual set top boxes 220 may be included, such as for example, an electronic game.

The media devices are coupled to a personal computer (PC) 226 having a central processing unit 232. A breakout box 288 may be used as part of a digital media hub to connect the media devices to the PC, to the display 201, and associated speakers 203 via bus 296. Breakout box 288 may include, for example, audio and video connectors such as S video, composite video, cable, audio left, audio right, and digital optical (SPDIF) connector ports.

PC 226 includes a graphics processor unit (GPU) 202 for generating three-dimensional images responsive to commands from CPU 232. A software driver 204 is included for CPU 232 to interact with the audio-visual devices. A tuner box 208 communicatively coupled to PC 226 permits commands from a remote control 224 to be input to PC 226. An IR blaster, for example, may be used to communicate commands between remote control 224 and PC 226.

PC 226 includes a media player module 280 to generate a media player for displaying media information. An example of a media player is the Nvidia NVDVD™ media player developed by the Nvidia corporation of Santa Clara, Calif. The Nvidia NVDVD™ media player supports a variety of audio and video media such as MP3 music, photo slideshows, DVD video files, VCD files, and MPEG files and is compatible with the Microsoft Windows® OS.

PC 226 includes a 3 D Media Control Module 290 to generate three-dimensional images representing media center icons on a display device 102 using a graphics processor 202. In one embodiment, 3 D media control module 290 is implemented as executable instructions in a local memory for processing by GPU 202.

In one embodiment, a set-up wizard module 292 is included to assist a user to perform a setup process for the connections of the media hub. Set-up wizard 292 may, for example, be implemented as executable instructions in a local memory.

In one embodiment, GPU 202 is implemented as a TV tuner card inserted into a PC. In this embodiment the TV tuner card may include a graphics processor chip, MPEG encoders for compressing audio/video content, interfaces for communicating between the card and a television and/or other media devices, and memory for recorded video. Alternatively, software may be used instead of MPEG encoders for compressing audio/video content. An example of such a TV card is part of the Personal Cinema™ product developed by the Nvidia Corporation of Santa Clara, Calif. that is designed to run with an Nvidia NVDVD media player and other associated media software, such as the WinDVR™ and WinDVD™ media software sold by InterVideo, Inc. of Fremont, Calif. or the Microsoft Media Player™ sold by the Microsoft corporation of Redmond, Wash.

Alternatively, it will be understood that all or part of media center 200 may be implemented as a set-top box. For example, the functionality of computer 226 may be integrated into a set top box or into a media hub for a television. Additionally, it will be understood that the functionality of a GPU may be integrated onto a CPU 232.

In one embodiment, media center 200 includes a wireless universal remote control 224 that permits the user to switch between different types of media devices 209, 210, 212, 214, 216, 218, or 220 via button mapping software 206 resident on PC 226. Remote control 224 may also include buttons or knobs to navigate through portions of display 201.

Figure 3:
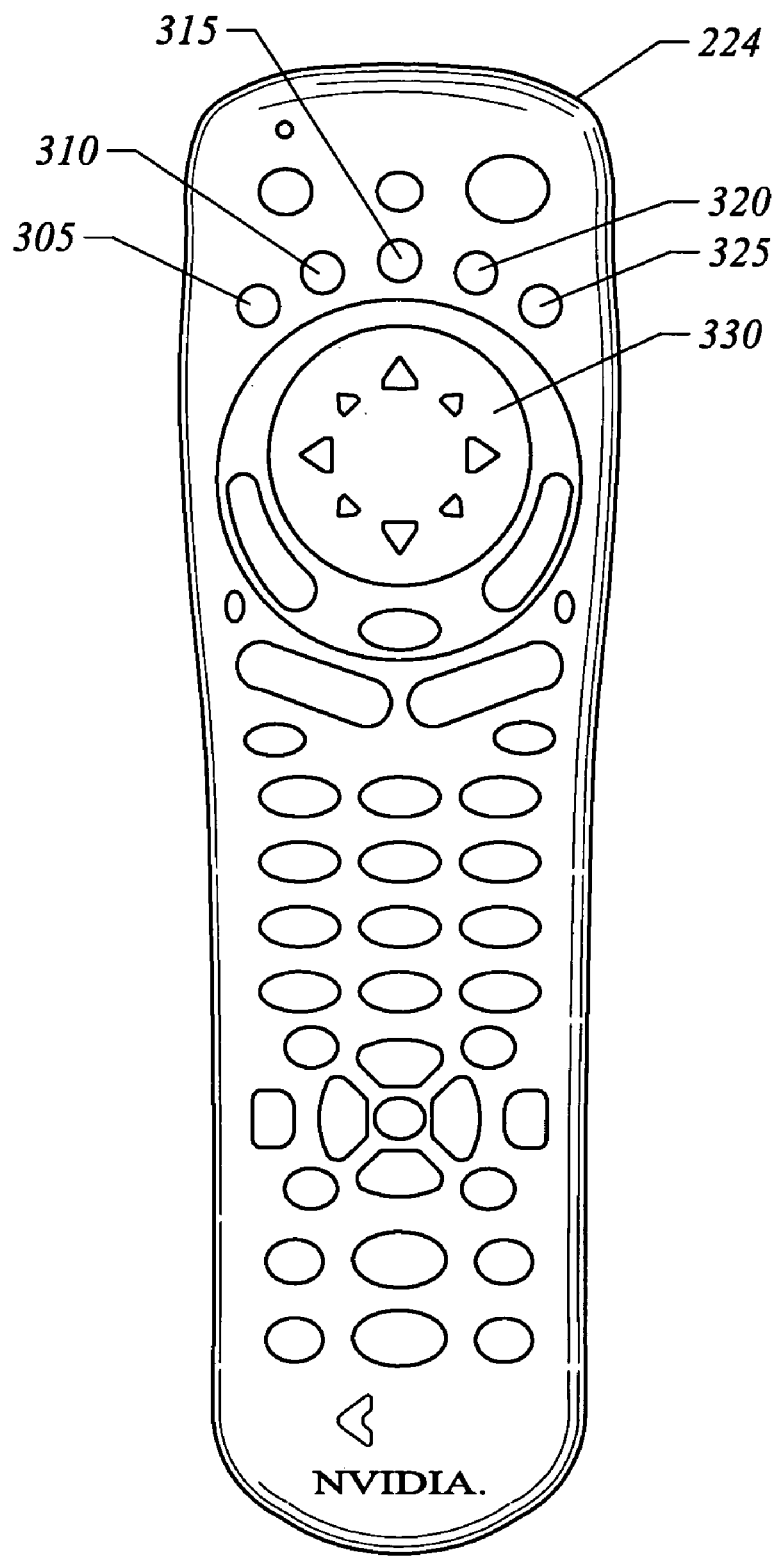
FIG. 3 illustrates an exemplary universal remote control for use in the media center of FIG. 2.
Figure 4:
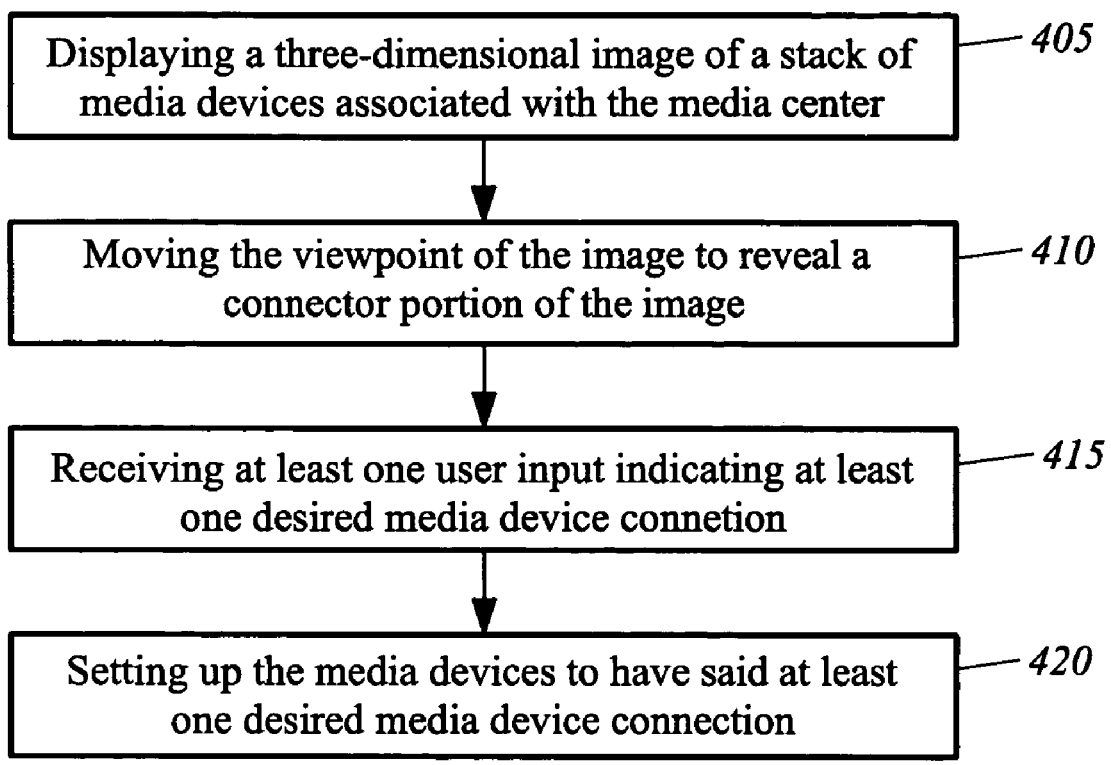
FIG. 4 is a flow chart of a method of setting up the media center using three-dimensional images, in accordance with an embodiment of the invention.

FIG. 3 illustrates an exemplary wireless universal remote control 224 having buttons 305, 310, 315, 320, and 325 for selecting a mode of operation, such as a TV mode button 305, a DVD mode button 310, a PVR mode button 315, an EPG mode button 320, or a MP3 mode button 325, although it will be understood that buttons may be included for other modes of operation as well. As described below in more detail, in some embodiments the buttons are color coded. An integrated mouse button 330 is included for free form navigation across a display. A universal remote control similar in design to that illustrated in FIG. 3 is sold as part of Nvidia's Personal Cinema™.

A media center may permit a variety of audio and video connections to be established in a set-up process. In one embodiment, the connections in the media hub are monitorable and/or selectable by setup wizard 292 and media hub 288. For example, PC 226 may use any known technique on bus 296 and hub 288, such as a broadcast/sensing or polling technique or a universal plug and play technique, to determine the interconnections of media devices.

Embodiments of graphical user interfaces for use in set-up processes are illustrated in FIGS. 4 and 5A-5C. Physical stacks of media devices commonly have connection ports disposed in the rear end of the devices. Referring to the flowchart of FIG. 4, a three-dimensional image representing media devices associated with the media center is displayed 405. For example, a three-dimensional media device icon representing a CD player, DVR, TV receiver, DVD player or other media device may be displayed. The three dimensional image may be in the form of a stack of media device icons (e.g., in an arrangement similar to many home entertainment systems in which physical media devices are arranged in a stack). The three dimensional image of the stack includes a front side and a rear connector side. The viewpoint of the three-dimensional image is moved 410 to reveal the connector portion of the image referencing the physical media device. For example, the three-dimensional image may be rotated to reveal the connector portion of the image. The three-dimensional image may then be used to display connections and modify physical input/output switching or to input commands to the setup wizard. For example, inputs from a user may be received 415 to indicate a desired media device connection. In one embodiment, the system then sets up 420 the desired media device connections.

Figure 5A:
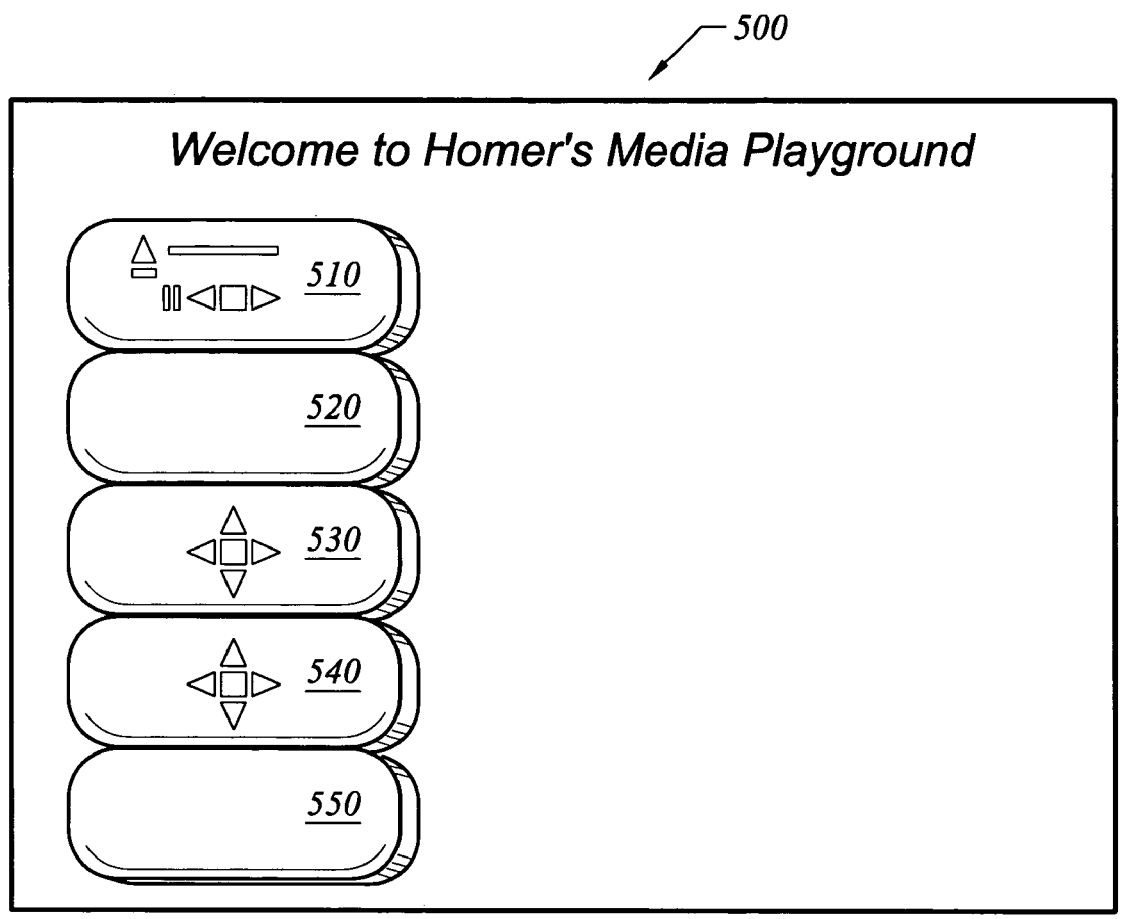
FIGS. 5A-5C are illustrative screen shots showing media device icons and their use during an initial set up of the media center, in accordance with an embodiment of the invention.
Figure 5B:
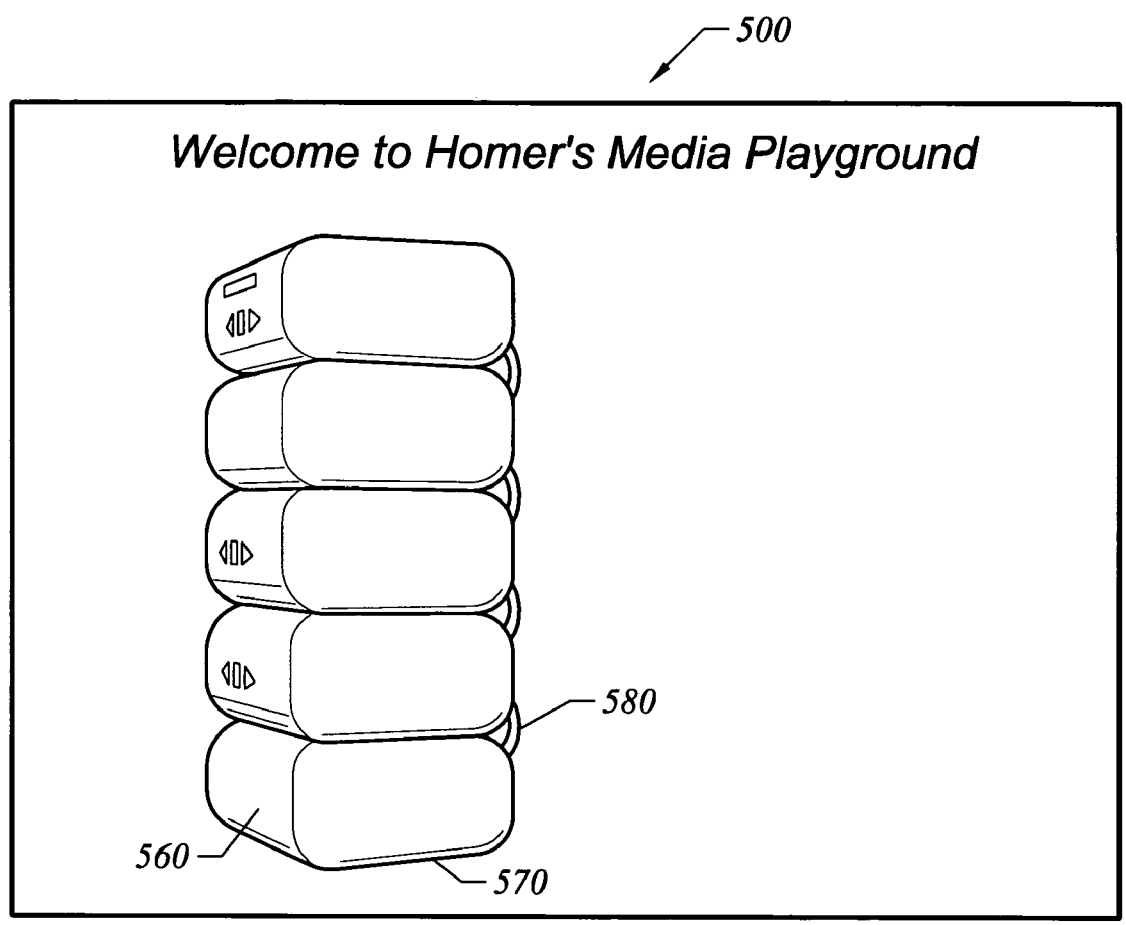
Figure 5C:
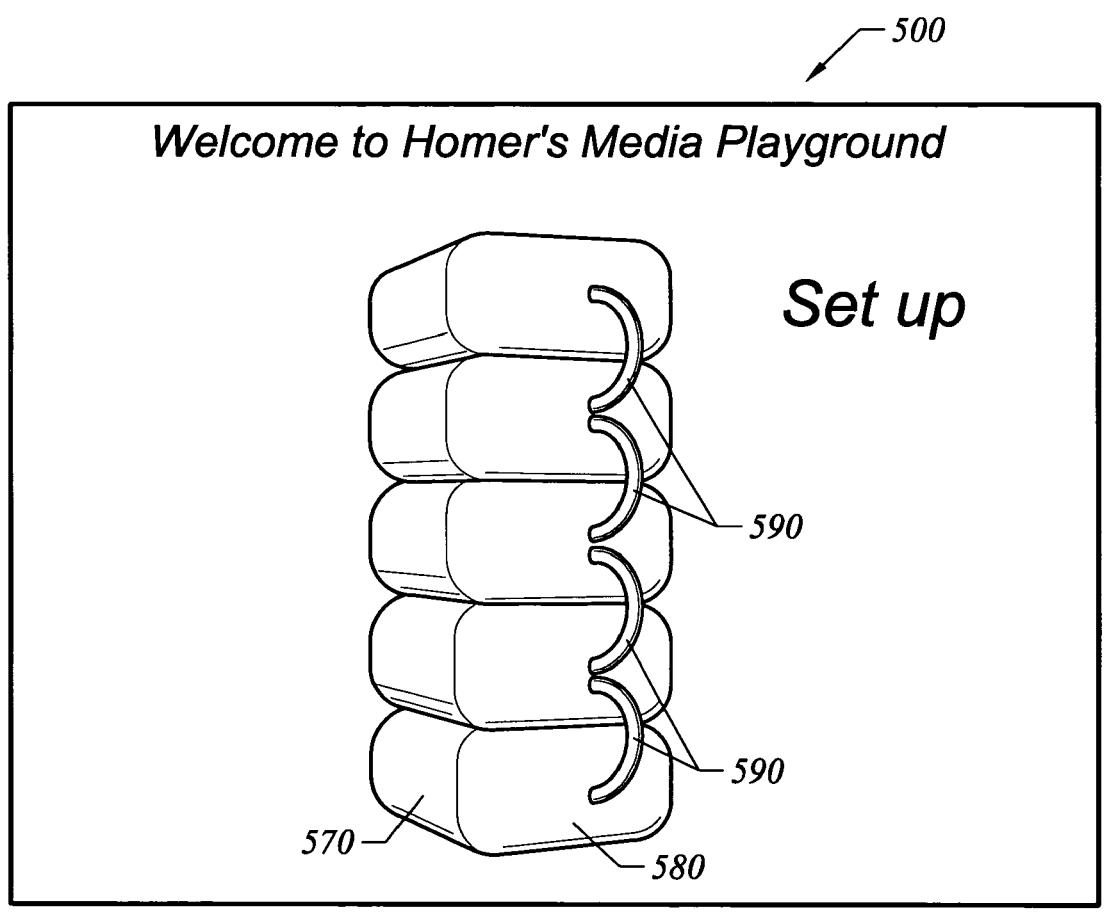

FIGS. 5A-5C are exemplary screenshots illustrating a method of setting up media device connections using icons to represent a stack of media device. Referring to FIG. 5A, a three dimensional image of a stack 500 of media devices may include media device icons representing a CD player 510, DVD 520, television receiver 530, EPG 540, and DVR 550. Each media device icon may have a unique color, shape, size, characteristic, or other features to differentiate it from the other media devices in the stack. In some embodiment, each media device icon may even comprise a digital photo or graphical representation of the actual physical media device. In one embodiment, each media device icon is an interactive graphical object that a user may select to launch a media player for the media device associated with an icon. Note that FIG. 5A shows the front face of the media device icons.

Referring to FIG. 5B, the stack 500 may be rotated in response to a user input. In the partially rotated view of FIG. 5B, the front face 560 and side face 570 are in view. A portion of the connector end 580 is barely visible.

Referring to FIG. 5C, rotation of the stack to a rear connector end 580 reveals connections 590 between the media devices or to a media hub (not shown). Thus, the user has a representation of a current state of connections in the media system 200, such as audio and video connections. The media device connections may then be adjusted, either manually or via the setup wizard. For example, a user may adjust the connections to select desired audio connections or video connections to achieve a desired selection of audio-video sources.

Figure 6A:
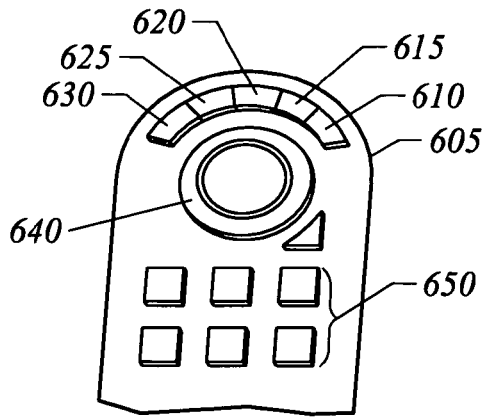
FIGS. 6A-6C show a remote control icon for representing a remote control, in accordance with an embodiment of the invention.

In one embodiment, a media center icon may include a graphical image of a remote control that is displayed to provide visual echo feedback and audio cues to a user that commands input from remote control 224 are being processed. Referring to FIG. 6A, a remote control icon 605 may include control features representing a universal remote control 224. For example, remote control icon 605 may include mode selection buttons 610, 615, 620, 625, and 630 and a mouse button 640 arranged in a similar pattern as universal remote control 224. Additionally, remote control icon 605 may also include other buttons or control surfaces 650 representing those on universal remote control 224.

The image of remote control 605 may be adjusted to indicate processing of a command input from a control surface of physical remote control 224. For example, if a button is depressed on physical remote control 224 to enter a command, such as a command to switch to a different media mode, a corresponding animation of the button on the image of remote control 605 may be seen to be depressed. This allows a user to receive confirmation that an instruction is being processed. In some embodiments, sounds and/or annotation may be provided as additional cues to a user that a command has been entered and is being processed.

Figure 6B:
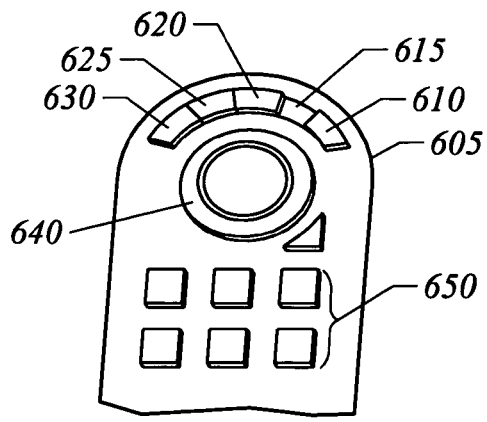
Figure 6C:
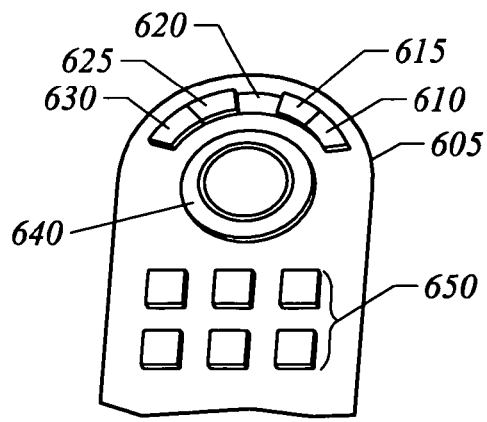

Remote control icon 605 preferably is a three-dimensional representation of a remote control. In some embodiments, remote control icon 605 is an animated three-dimensional image of a remote control in which the animation is adjusted to indicate depression of buttons. For example, FIGS. 6B and 6C illustrate the depression of buttons 615 and 620. Alternatively, the color, brightness, or other visual attribute of corresponding buttons may be adjusted to indicate processing of a command from a corresponding button on the physical remote control. The change in state of a virtual control surface may be for a short time period (e.g., one second) or until the command is processed.

Figure 7A:
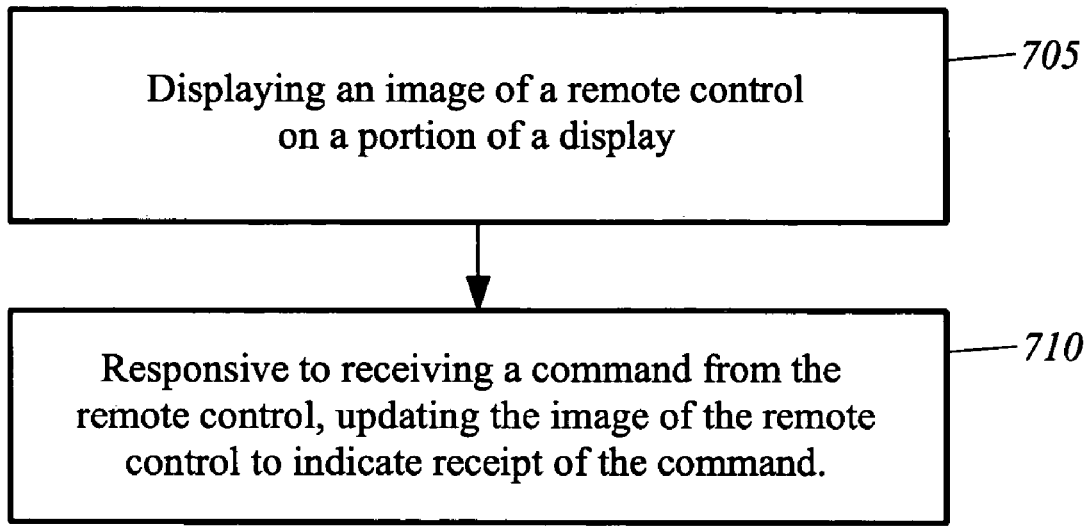
FIGS. 7A-7B are flow charts illustrating methods for using a remote control icon to indicate the processing of commands input from a remote control, in accordance with embodiments of the invention.
Figure 7B:
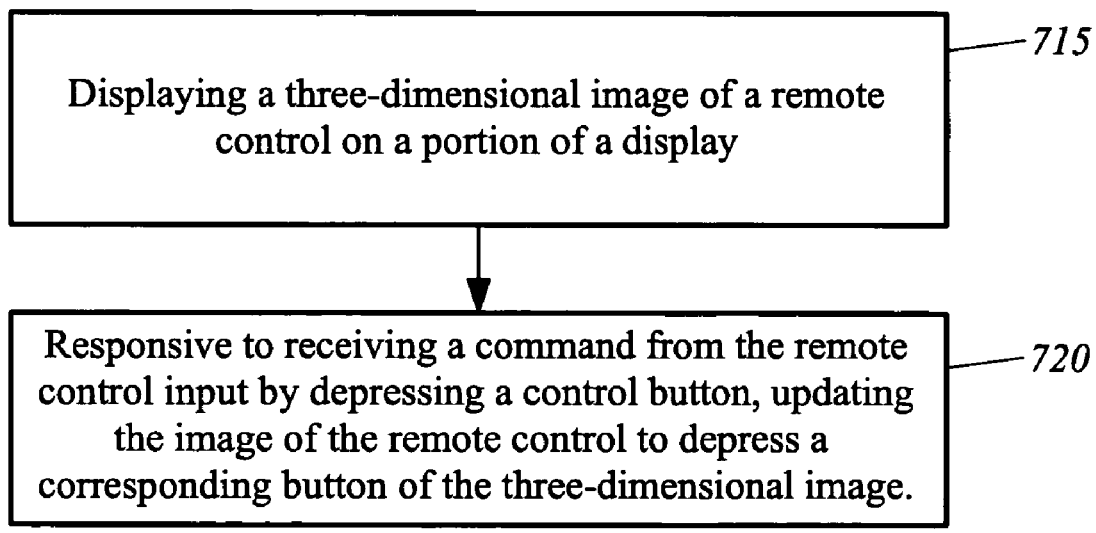

FIGS. 7A and 7B are flowcharts illustrating methods of using a remote control icon. Referring to FIG. 7A, in one embodiment, an image of a remote control is displayed on a portion of a display 705. Responsive to receiving a command from the physical remote control, the image of the remote control is updated 710 to indicate receipt of the command.

Referring to FIG. 7B, in another embodiment, a remote control is displayed 715 having buttons arranged similarly to the physical remote control. In one embodiment, the animated remote control can be seen as a digital photo of the actual physical remote control used to control the appliances. Responsive to a user pressing a control button on the remote control by depressing the button, the image of the remote control is updated 720 by showing a corresponding button being depressed.

One benefit of displaying a remote control icon 605 is that it provides a user with visual feedback that commands from the physical remote control are being processed. A media device may require a significant length of time, such as more than one second, to bring up (e.g., to bring up the hardware of the media device, load software, and display an appropriate media player). Consequently, remote control icon 605 provides a user a visual cue that a command to switch modes to a different type of media is being processed. Additionally, it will be understood that an animation of a remote control icon may be used in a variety of different ways to provide visual feedback to a user of the interaction of the physical remote control with the media center/server.

Embodiments of the present invention include a navigation mode for navigation and a viewing mode. The viewing mode may, for example, be a full screen view of the content. The navigation mode, as described below, may include elements specifically designed to assist a user to navigate between media devices and control them to access context and/or content.

FIGS. 8A-8D are exemplary screenshots illustrating embodiments of a media player icon 810. The media player icons are three-dimensional objects. The GPU may be used to map video textures onto the three-dimensional objects. Media player icon 810 represents a three-dimensional flat panel display having side surfaces 814 and a back surface (not shown), as described below more in detail. A front surface 802 of the media player icon includes a media window 815 having a surface for displaying content. In one embodiment, the stack of media device icons 500 remains in the background and a user may select a media device icon 510, 520, 530, 540, or 550 to open a corresponding media player icon to display content for the selected media device.

Media player icon 810 may have its media window 815 devoted to displaying only one type of media. However, in some embodiments, media window 815 has a mode of operation in which it is partitioned into two or more portions 804 and 816 for displaying different types of media information simultaneously.

In one embodiment, an active media player icon 810 has its corresponding media device icon displayed proximate the media player icon. Thus, the user has an additional visual cue regarding the active media device for which content is being displayed. Note that in some embodiments the remote control icon 605 may also be displayed.

Figure 8A:
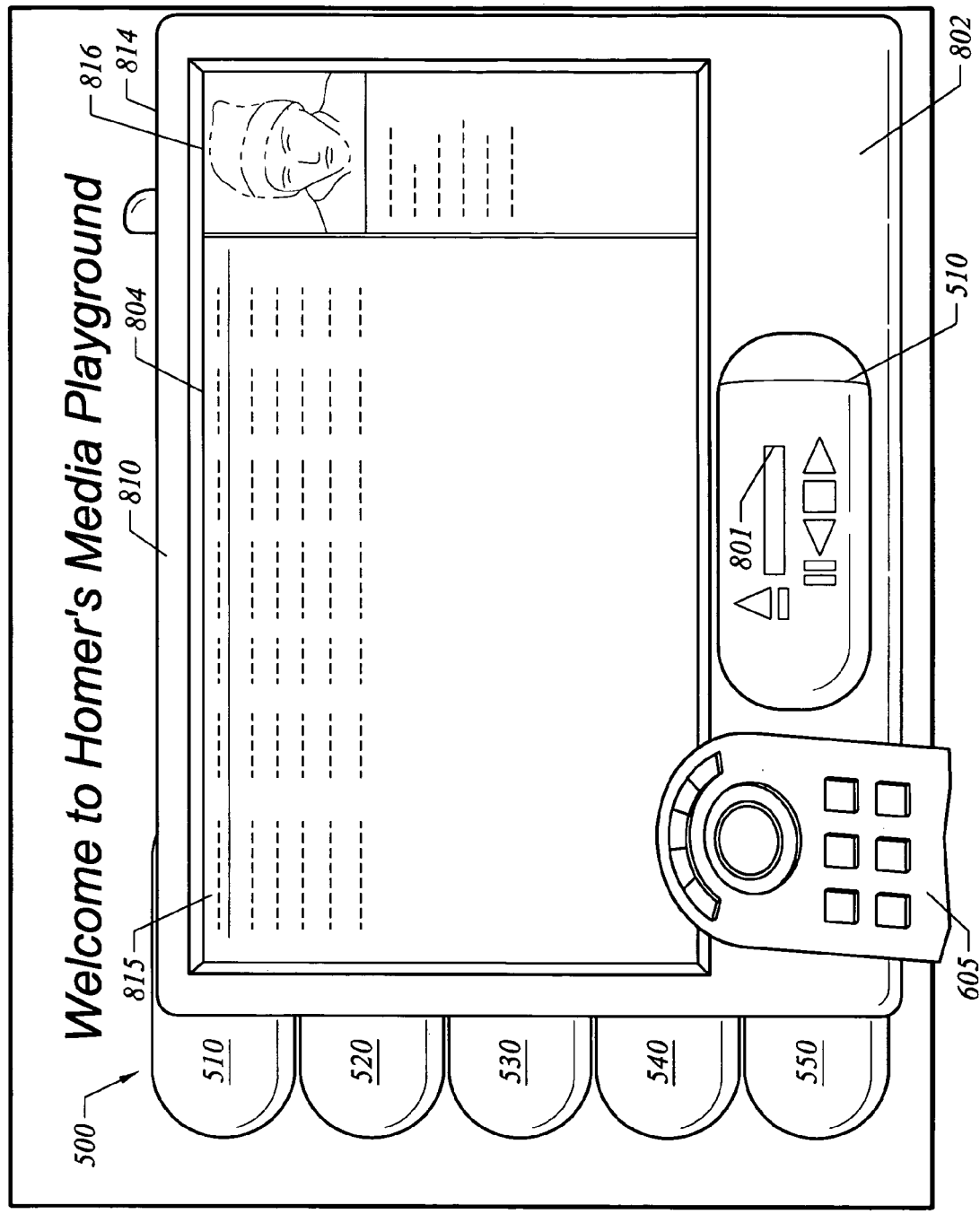
FIGS. 8A-8D are exemplary screen shots showing media player icons and associated media device icons, in accordance with embodiments of the invention.

FIG. 8A illustrates media window 810 playing a CD from a CD player. Note that the CD player icon 510 may be displayed in the foreground to indicate that the CD media device is active. In this example, the media window 815 may display a list of songs on a first portion 804 of the media player window and associated cover art and metadata on a second portion 816. In one embodiment a user may select second portion 816 to access additional information for the CD. In some embodiments, CD player icon 510 includes a CD player tray 801 to represent whether a CD is loaded/unloaded. An animation of playlist songs may drop into the CD player tray 801 to emulate a physical CD player/changer playing discs on a tray. Additionally, CD player tray 801 may move to an unloaded position to a loaded position to indicate that a CD has been successfully loaded.

Figure 8B:
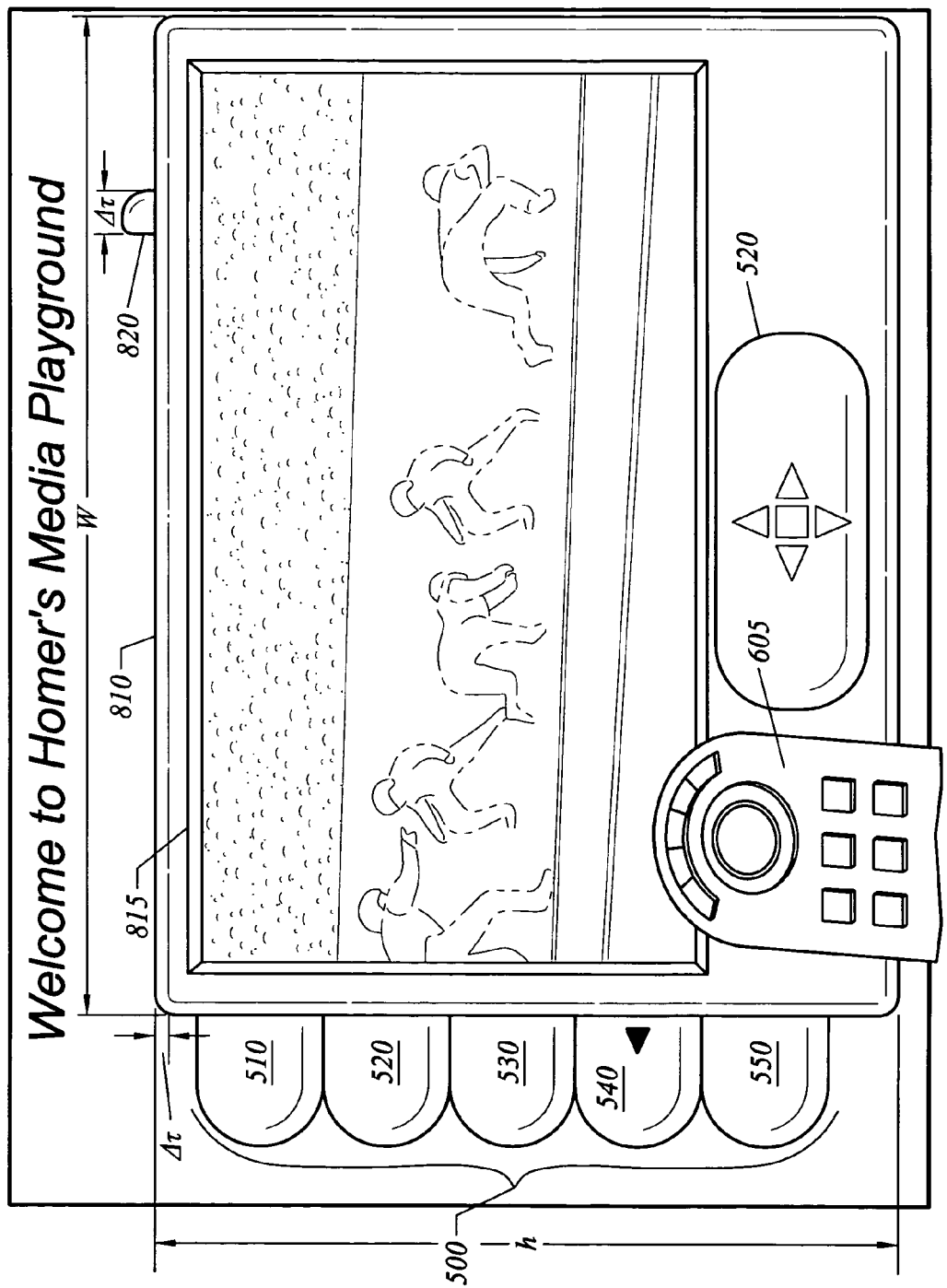

FIG. 8B illustrates a media player icon 810 having media window 815 displaying a television program from the television receiver. Note that the television media device icon 520 may be displayed in the foreground of the media player to indicate that the television receiver is active. The media player icon 810 has an associated height, h, width, w, and thickness, t. As described below in more detail, in one embodiment, an inactive media player icon 820 is rotated approximately ninety degrees such that only a side view of a portion of the edge is visible. This three-dimensional stacking of media player icons uses space efficiently and helps to distinguish between active and inactive media player icons, i.e., inactive media player icons are rotated orthogonally in any plane to the active media player icon. Additionally, the three-dimensional stacking of media player icons maintains user interface continuity and context.

Figure 8C:
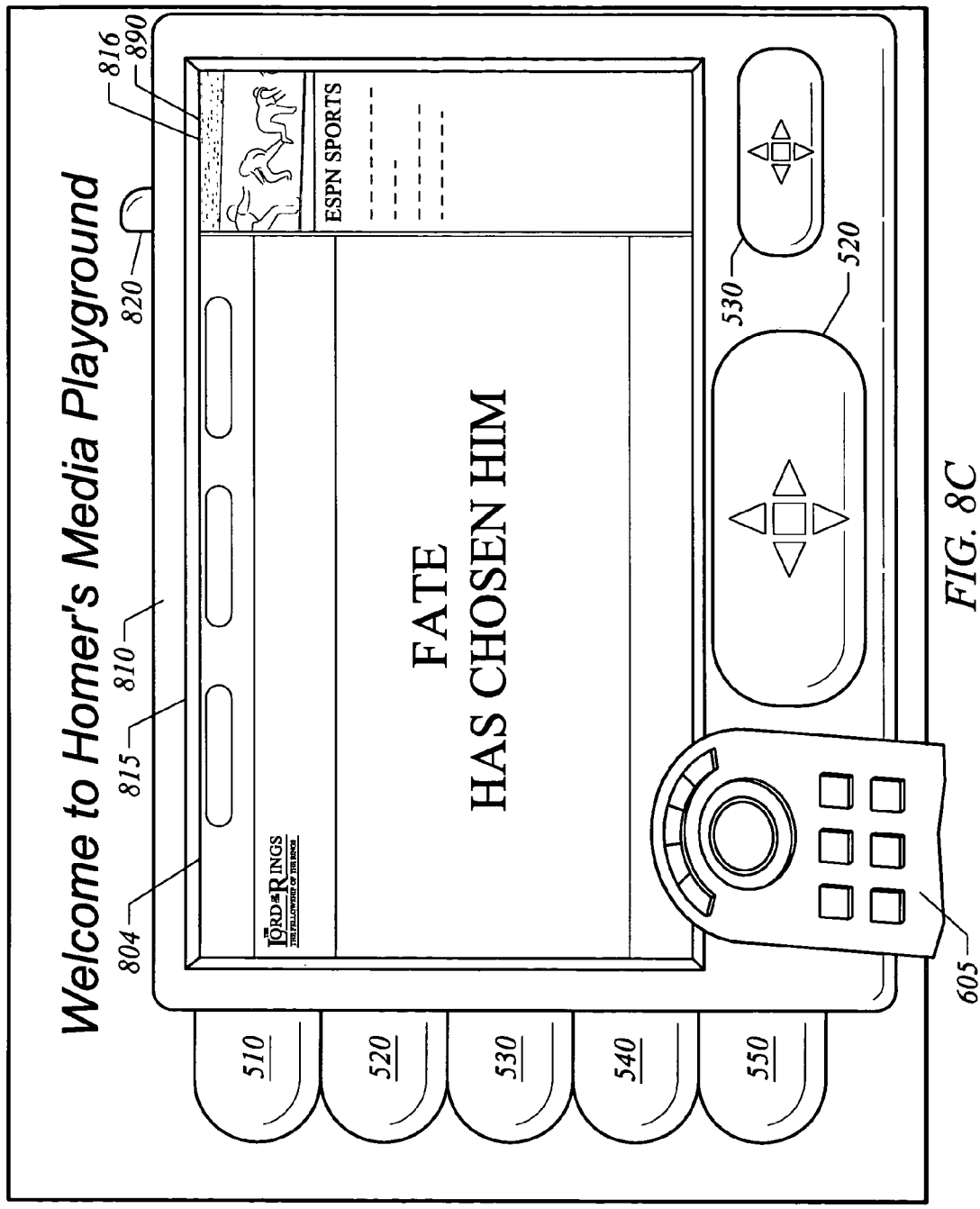

FIG. 8C illustrates a media player icon 810 having a media window 815 displaying a video file, such as a DVD movie on a first portion 804 of the window. In this example, a DVD icon 530 may be displayed to indicate that the DVD player is active. A smaller window 890 for displaying television content and metadata may be left open on a second portion 816 of the media window. In one embodiment, a user may select an image or metadata on second portion 816 to access individual television shows. This facilitates a user navigating between DVD and television modes.

Figure 8D:
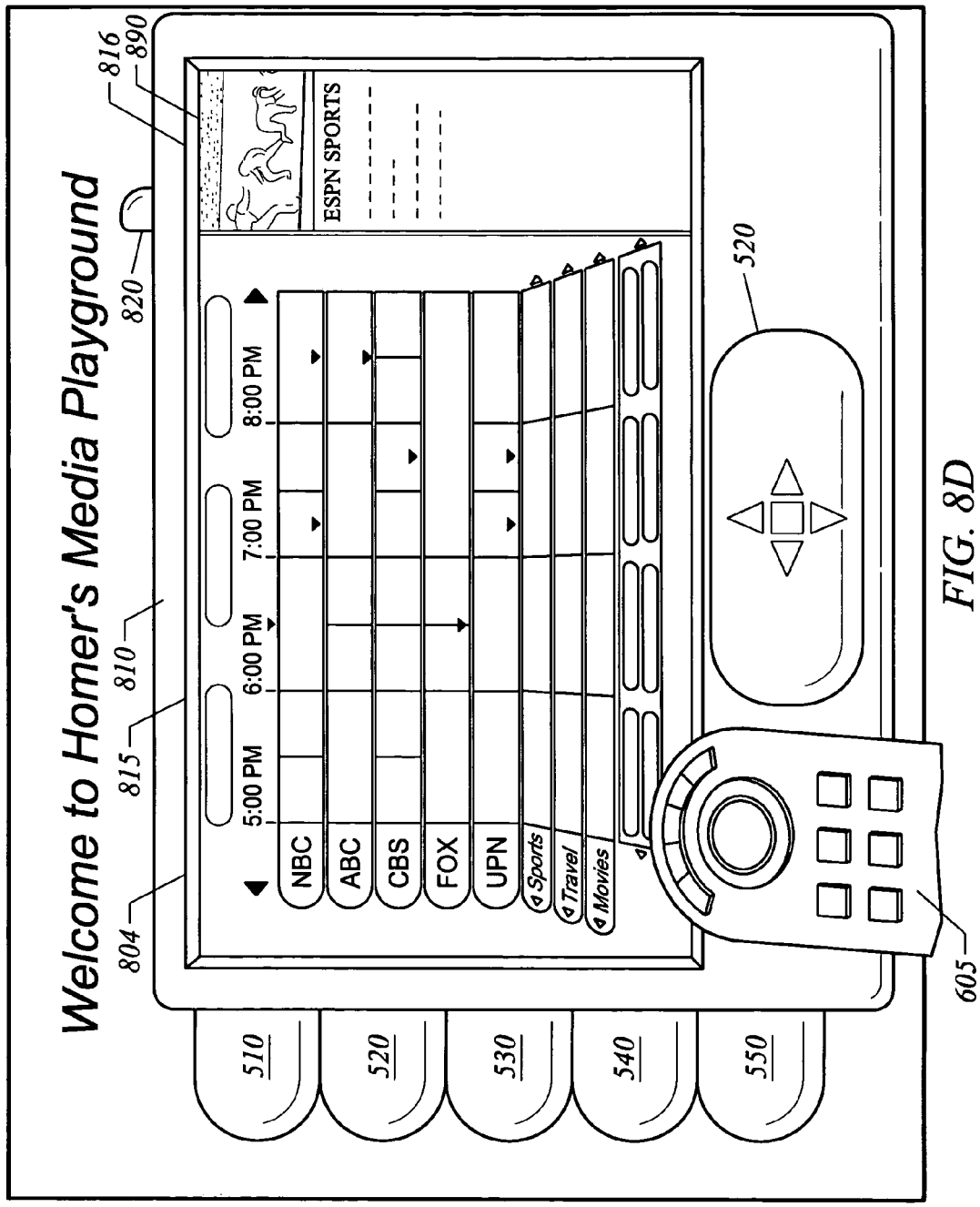

FIG. 8D illustrates a media player icon 810 having media window 815 displaying an electronic program guide and a guide to stored PVR files on a first portion 804 of the display window. Television images 890 and metadata may be displayed on a second portion 816 of the media window. An exemplary EPG is described in more detail in co-pending application "Apparatus and Method for 3 D Electronic Program Guide Navigation," by William Herz, application Ser. No. 10/609,204, filed Jun. 27, 2003, which is commonly owned by the assignee of the present application, the contents of which are hereby incorporated by reference in their entirety.

Figure 9A:
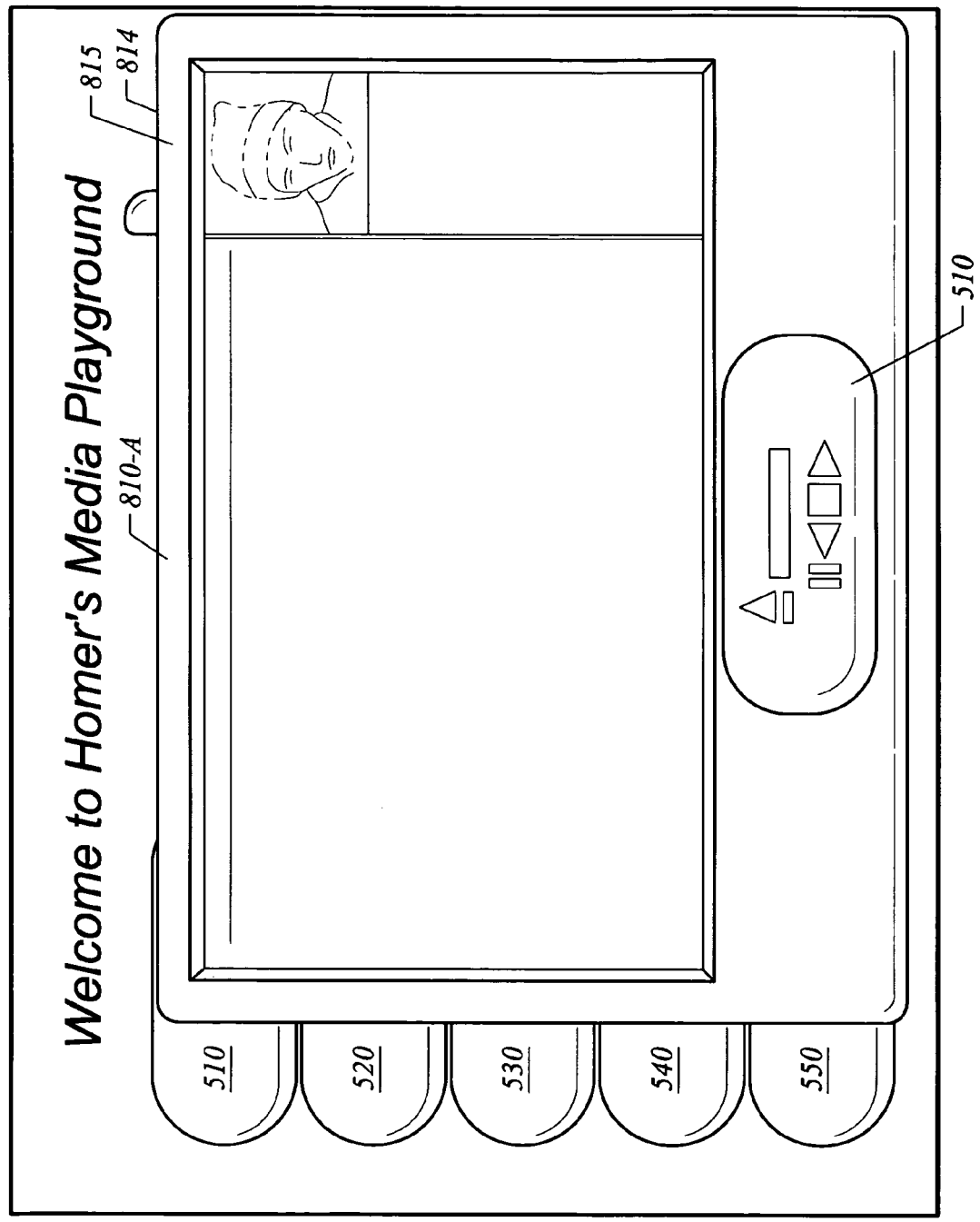
FIGS. 9A-9E are exemplary screen shots illustrating rotation of an inactive media player icon to a side view in response to a command to select another media device, in accordance with embodiments of the invention.

FIGS. 9A-9E are exemplary screenshots illustrating an embodiment in which three-dimensional effects are used to assist a user to navigate two or more active devices. In particular, in some embodiments, a media player icon that is inactive is flipped out of main focus while having some remnant still visible so that the user can retrieve or know what content is already open. Referring to FIG. 9A, a first media player icon 810-A having a media window 815 for an active media device is displayed, such as a media window 815 for a CD player media device icon 510.

Figure 9B:
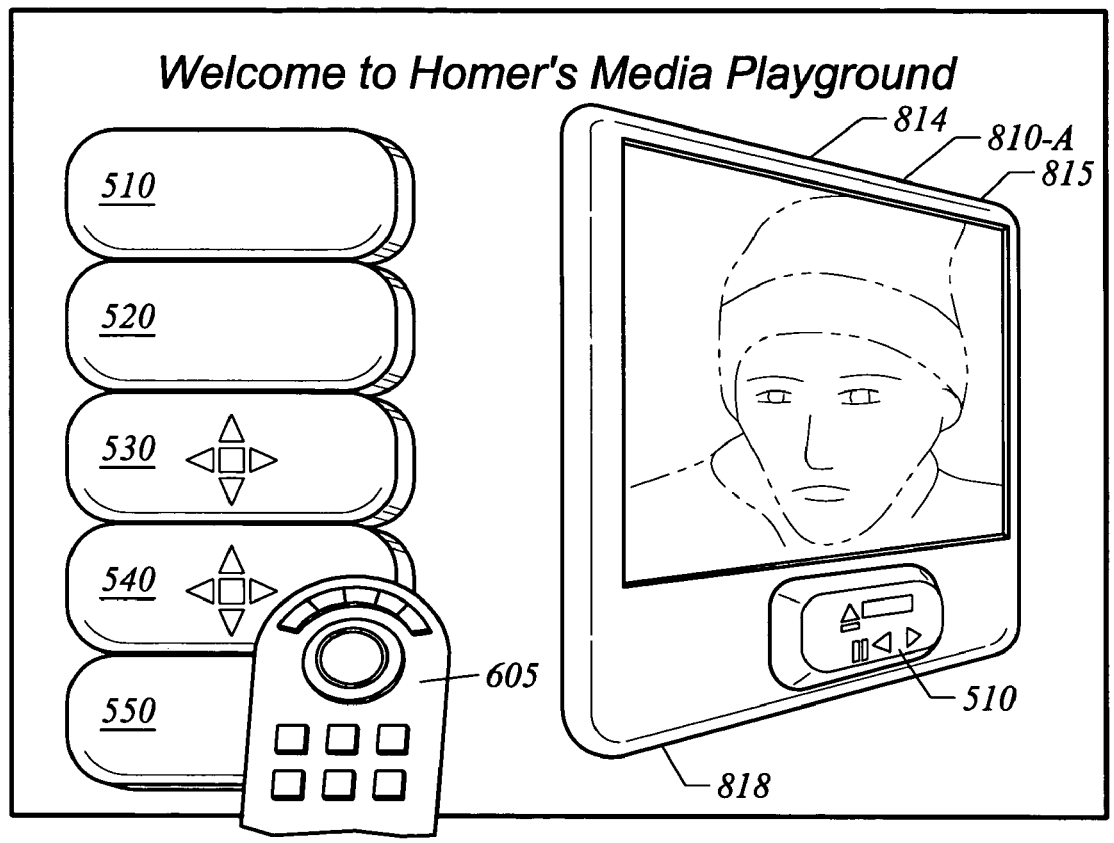

In response to a command to switch to a different type of media device, such as the media device associated with media device icon 530, the media player icon 810 is rotated, as indicated in FIG. 9B. The content on media window 815 of the media player may be transformed during rotation using a conventional graphical transform.

Figure 9C:
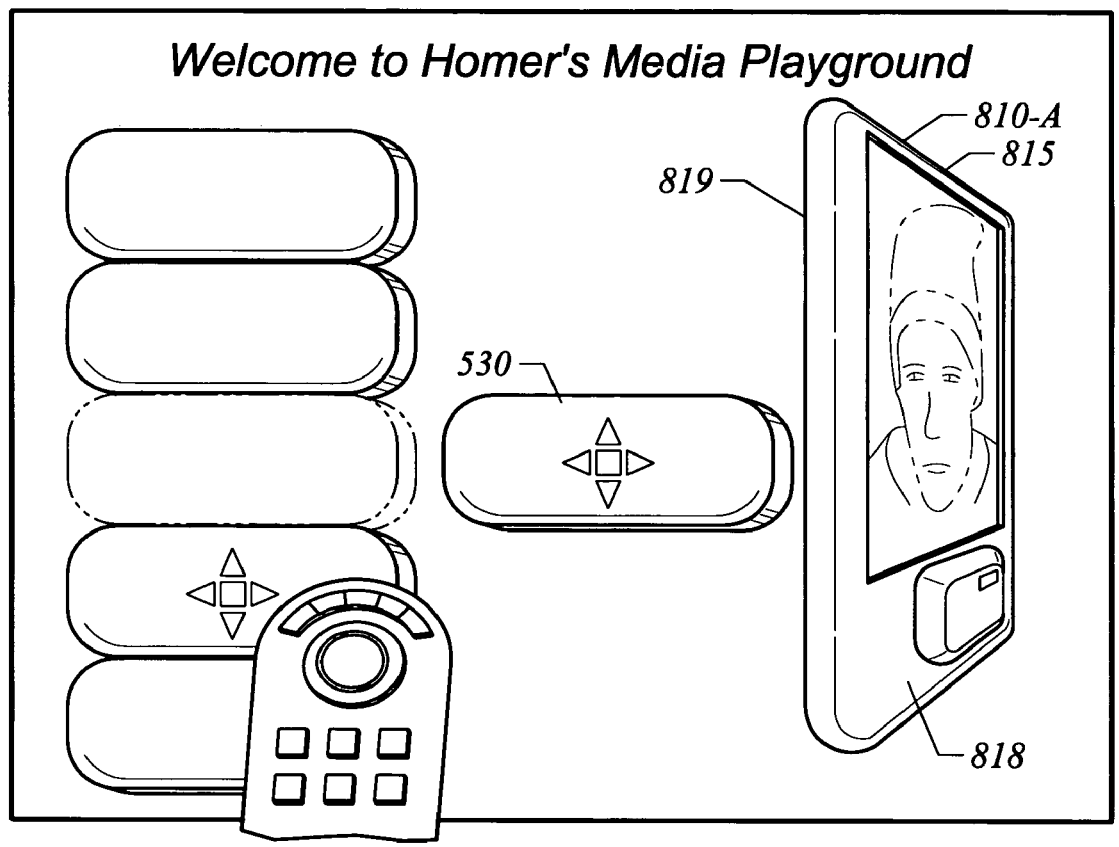

As illustrated in FIG. 9C, the first media player 810-A is rotated further (and may also be translated as well) to expose a side edge 818 and back surface 819. In one embodiment, a copy of the media device icon 530 associated with a newly opened media device window is also created to provide contextual information that the new media player is being opened.

Figure 9D:
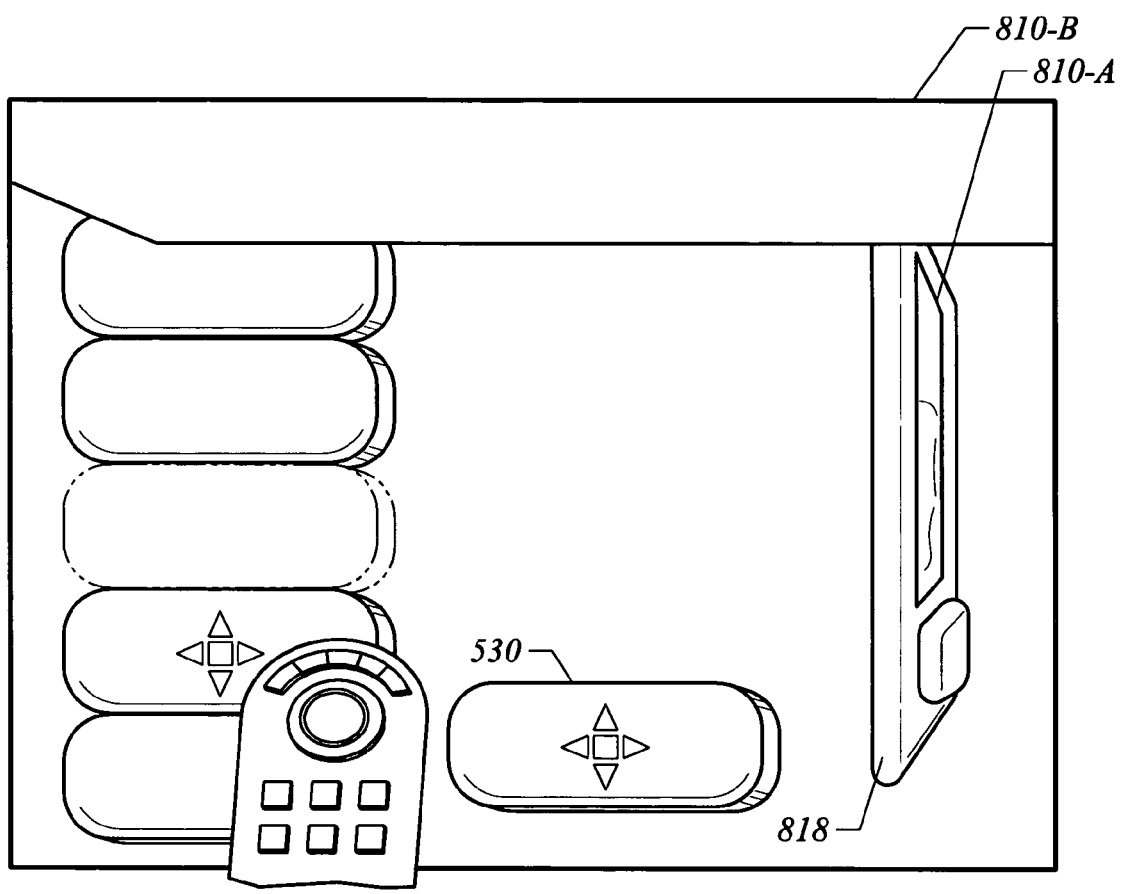

Referring to FIG. 9D, a new media player icon 810-B is then opened. In one embodiment, the new media player icon 810-B is rotated into place over the rotated media player icon 810-A.

Figure 9E:
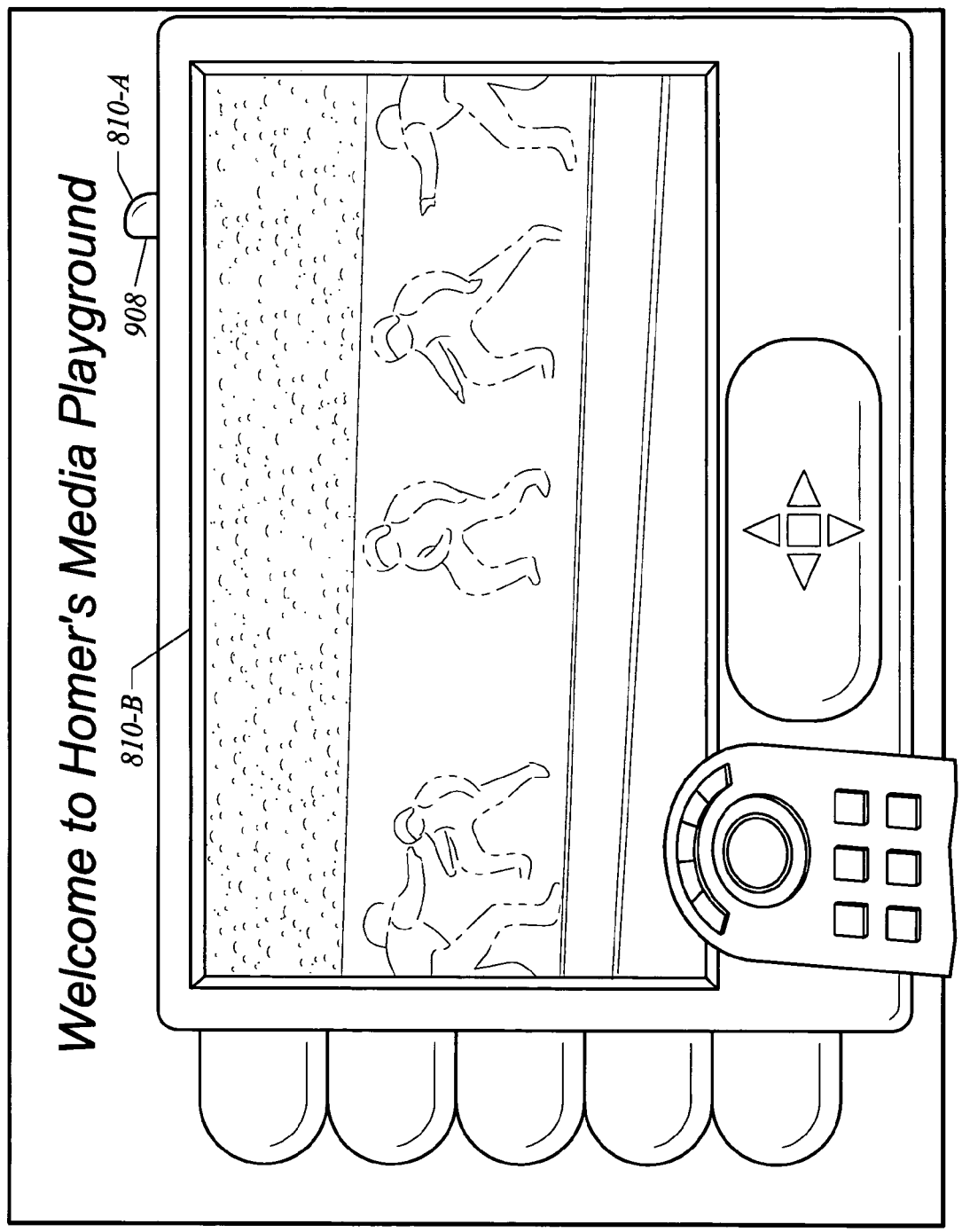

FIG. 9E shows the new media player icon 810-B opened over the inactive second media player icon 810-A. However, a portion 908 of the side edge of the inactive media window remains visible, providing a user a visual clue to navigate between media player icons. In some embodiments, a user may select the unobstructed portion 908 (or a virtual handle) to reopen media player icon 810-A.

One benefit of rotating previously used media player icons is that it is space efficient and easy to use. It also conveys additional information regarding the navigation history (e.g., such as what songs are selected, what TV channel is being played, etc.) By way of contrast, a conventional tiling technique in which active and inactive windows are layered upon one another can be confusing for users to navigate, particularly if the user is navigating between media player icons under conventional television viewing conditions, e.g., from a distance and with a remote control.

Figure 10:
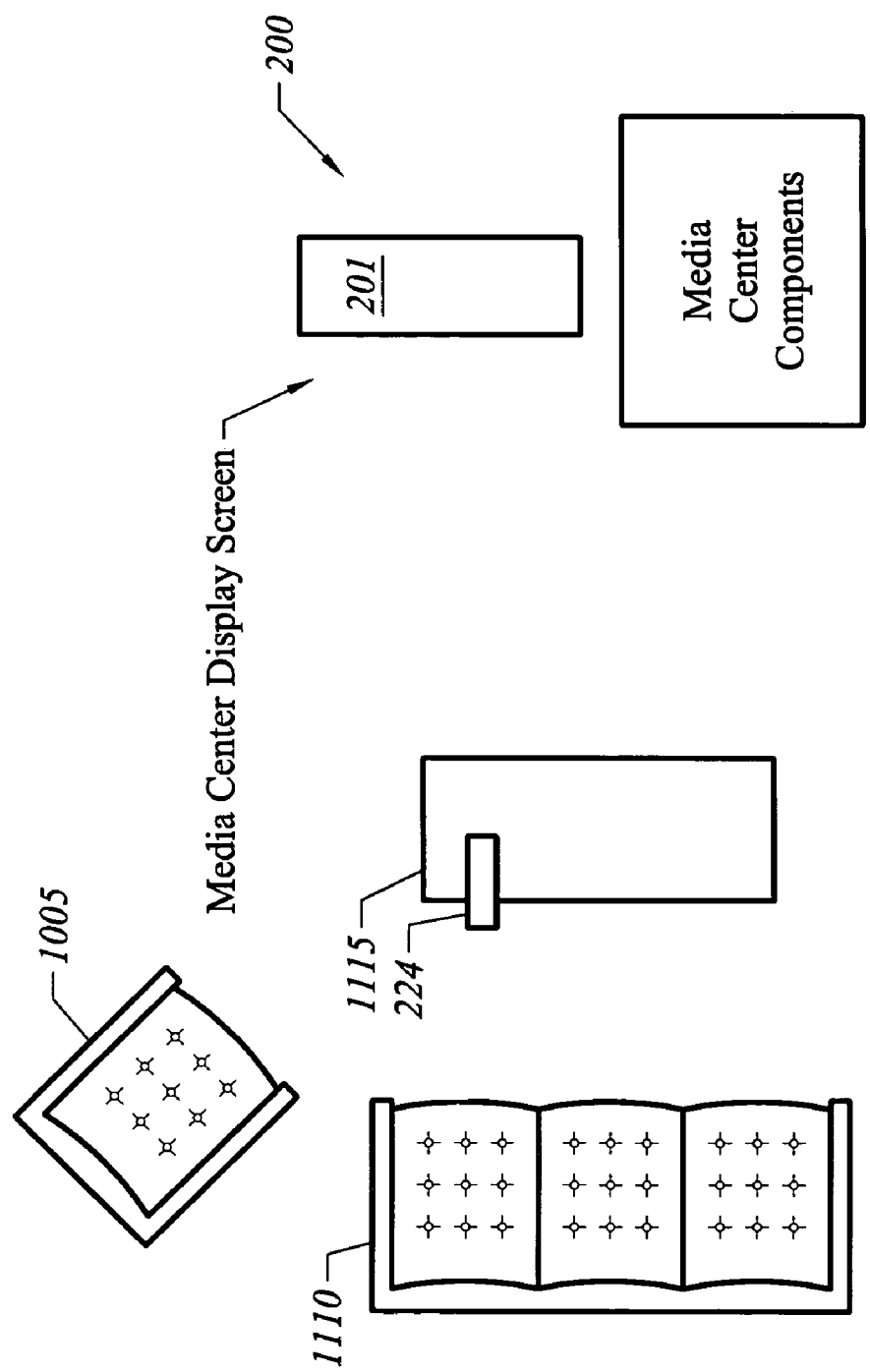
FIG. 10 is a top view of home environment of a media center, illustrating an exemplary application of embodiments of the present invention.

In addition to the other benefits provided by the present invention, the graphical user interface is beneficial in home environments in which a user sits a substantial distance away from the display. FIG. 10 is a top view of an exemplary home environment for media center 200. For example, in a home living room environment, chairs 1005 and couches 1110 may be separated a considerable distance from display 201 of media center 200, such as by tables 1115 or other furniture. Thus, it is desirable that the graphical user interface displayed on display 201 be easy to understand from a distance, such as when seated in a chair or couch ten feet or more away from the display screen. Additionally it is desirable that the graphical user interface is easy to navigate using a wireless remote control 224. The previously mentioned graphical user interface and animations improve a user's ability to navigate a media center, particularly in regards to environments in which a user is positioned a substantial distance from a display screen and has only a wireless remote control for navigation.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method of using a graphical user interface to navigate a media center having a computer including an associated graphics processor to generate three-dimensional images, comprising:

the computer and associated graphics processor displaying a remote control icon that is a three-dimensional representation of a physical universal remote control of the media center; and in response to a user inputting a command by pressing a button of the physical universal remote control, the computer and associated graphics processor updating said three-dimensional representation to display a three-dimensional animation of the button being depressed on the three-dimensional representation of the physical universal remote control to indicate to the user that the command was received by the media center, wherein updating said three-dimensional representation comprises displaying a three-dimensional perspective view of the button being depressed on the three-dimensional representation of the physical universal remote control.

2. The method of claim 1, wherein said command is a command to select one of a plurality of media devices.

3. The method of claim 1, wherein said computer and associated graphics processor displaying the remote control icon comprises: said computer and associated graphics processor displaying media device icons for a plurality of media devices controlled by the physical universal remote control.

4. The method of claim 3, wherein said plurality of media devices includes at least one of a TV receiver, DVR, PVR, EPG, CD player, DVD player, interactive electronic game, digital radio, or an Internet appliance.

5. The method of claim 3, wherein said media device icons comprise three-dimensional representations of media devices.

6. The method of claim 3, wherein:

a first media center icon is a media player icon having a window disposed on a front surface for displaying media, a back surface, and a side surface connecting said front and back surfaces; and said updating by the computer and associated graphics processor further comprises in response to a command to change from a first media device to a second media device:

rotating said first media player icon from a front view to a side view; and opening the second media player icon;

wherein a portion of the side of said first media player icon remains unobstructed from view by said second media player.

7. The method of claim 6, wherein said first media player icon is activated by selecting an unobstructed portion of said first media player icon.

8. The method of claim 1, wherein the remote control icon has buttons representing a plurality of media control buttons of said physical universal remote control; said buttons of the remote control icon being updatable by the computer and associated graphics processor to represent processing of commands received from said physical universal remote control.

9. The method of claim 8 further comprising the computer and associated graphics processor displaying at least one media center icon, wherein said at least one media center icon comprises:

a media player icon having a window disposed on a front surface for displaying media content, a back surface, and at least one side surface;

wherein a front view and a side view of the media player icon may be displayed.

10. The method of claim 1, wherein said three-dimensional representation is a digital photo representation of the actual remote control.

11. The method of claim 6, wherein at least one media player icon has a video texture mapped onto a display surface of the media center icon.

12. The method of claim 9, wherein said at least one media player icon has a video texture mapped onto a display surface of the media center icon.

13. A media center, comprising:
- a display;
- a universal remote control having a plurality of buttons to control a plurality of media devices of the media center;
- a computer and associated graphics processor, the computer receiving commands from the universal remote control;
- said computer displaying three-dimensional media center icons to represent attributes of said media center including generating a remote control icon that is a three-dimensional representation of the universal remote control and updating said three-dimensional representation to display a three-dimensional animation of the button being depressed on the three-dimensional representation of the universal remote control to indicate to the user that corresponding commands are received by the media center, wherein updating said three-dimensional representation comprises displaying a three-dimensional perspective view of the button being depressed on the three-dimensional representation of the physical universal remote control.

14. The media center of claim 13, where said computer is configured to display media center icons for a stack of entertainment devices based on which button of said universal remote control is pressed.

15. The media center of claim 13, wherein said computer is configured to display media center icons for a plurality of media devices and their associated connections during a setup step for establishing media device connections.

16. The media center of claim 13, wherein said computer is configured to display media center icons comprising media player icons.

17. The media center of claim 16, wherein at least one media center icon is an inactive media window icon corresponding to an edge-view of a media player icon.

18. The media center of claim 13, wherein said three-dimensional representation is a digital photo representation of the actual remote control.

19. The media center of claim 13, wherein said at least one media player icon has a video texture mapped onto a display surface of the media center icon.

* * * * *